(12) United States Patent
Yeomans

(10) Patent No.: US 6,637,427 B1
(45) Date of Patent: Oct. 28, 2003

(54) RADIANT ENERGY ABSORBERS

(76) Inventor: Allan James Yeomans, 60 Sunrise Boulevard, Surfers Paradise, Gold Coast, QLD 4217 (AU)

(*) Notice: Subject to any disclaimer, the term of this patent is extended or adjusted under 35 U.S.C. 154(b) by 0 days.

(21) Appl. No.: 10/030,660

(22) PCT Filed: Apr. 20, 2000

(86) PCT No.: PCT/AU00/00359
§ 371 (c)(1),
(2), (4) Date: May 31, 2002

(87) PCT Pub. No.: WO00/65286
PCT Pub. Date: Nov. 2, 2000

(30) Foreign Application Priority Data

Apr. 22, 1999 (AU) .................. PP9900
Jun. 21, 1999 (AU) .................. PQ1072

(51) Int. Cl.[7] .................. F24J 2/22; F24J 2/24
(52) U.S. Cl. .................. 126/675; 126/656
(58) Field of Search .................. 126/675, 634, 126/649, 656, 671, 714, 653; 165/142, 133, 904

(56) References Cited

U.S. PATENT DOCUMENTS

| | | | | |
|---|---|---|---|---|
| 3,952,724 A | * | 4/1976 | Pei | .................. 126/655 |
| 3,954,097 A | * | 5/1976 | Wilson, Jr. | .................. 126/656 |
| 4,296,738 A | * | 10/1981 | Kelton | .................. 126/656 |
| 4,452,233 A | | 6/1984 | Goodman, Jr. et al. | |
| 4,554,908 A | | 11/1985 | Hanlet et al. | |
| 4,608,451 A | | 8/1986 | Landis | |
| 5,592,932 A | * | 1/1997 | Yeomans | .................. 126/686 |

FOREIGN PATENT DOCUMENTS

| | | |
|---|---|---|
| DE | 4124795 | 2/1992 |
| DE | 19549311 | 7/1997 |
| FR | 2412036 | 7/1979 |
| FR | 2501846 | 9/1982 |
| WO | 9624148 | 8/1996 |

* cited by examiner

*Primary Examiner*—Alfred Basichas
(74) *Attorney, Agent, or Firm*—Wood, Phillips, Katz, Clark & Mortimer

(57) ABSTRACT

A radiant energy absorber (39) having an absorber tube (40) formed with V-shaped grooves (41) in its outer surface to enhance energy collection. The radiant energy absorber (39) may also include an inner tube (43) and a helically extending wire (48) in the annular space between the inner tube (43) and outer tube (40) which defines a helically extending flow passage along which the medium flowing into the absorber is constrained to pass.

18 Claims, 3 Drawing Sheets

RADIANT ENERGY ABSORBERS

TECHNICAL FIELD

This invention relates to radiant solar energy absorbers as used for example in radiant solar energy concentrating apparatus. The present invention also relates to solar energy concentrating apparatus incorporating such radiant energy absorbers.

BACKGROUND ART

In solar energy collecting apparatus, a solar energy absorber is usually provided to absorb solar energy concentrated or collected by the apparatus. In one arrangement, solar energy is concentrated on a absorber in the form of a tubular member which carries an energy transfer medium which may be oil, water or other fluid. To increase radiant energy collection, the absorber may be provided with a selective surface. Alternatively, the absorber may have its exposed surface treated so as to be for example a black surface to increase energy collection and to ensure efficient energy transfer to the energy transfer medium.

Where the tubular absorber carriers an energy transfer medium in the form of water, the water is heated by the concentrated solar energy and may be converted under the influence of the concentrated solar energy into steam for example for driving steam turbines which drive electrical generators for the generation of power

SUMMARY OF THE INVENTION

The present invention aims in one aspect to provide a solar energy absorber for use in radiant solar energy concentrating apparatus which has improved energy collection properties for the purposes of the efficient heating of water and/or steam. The present invention in yet a further aspect aims to provide radiant solar energy concentrating apparatus incorporating a solar energy absorber of the above type. The present invention in yet a further aspect aims to provide method for producing superheated steam using solar energy concentrating apparatus incorporating an improved solar energy absorber. Other objects and advantages of the invention will become apparent from the following description.

The present invention thus provides in a first aspect, a solar concentrator absorber tube assembly for receiving and collecting radiant solar energy concentrated by said solar concentrator, said absorber tube assembly comprising a fluid flow absorber tube having an outer surface arranged to be exposed in use to said concentrated solar energy, said surface being provided with a plurality of grooves, said grooves being of substantially V-shaped configuration in cross section, and a helically extending flow passage within said fluid flow tube and adjacent, said outer surface for the passage of water and/or steam through said absorber tube assembly.

Suitably, a longitudinally extending annular space is formed within the tube adjacent the outer surface thereof and the helically extending passage is formed within the annular space. Most suitably, helically extending barrier means are provided within the annular space to define the helically extending flow passage.

The annular space suitably is defined between the wall of the tube and an inner wall or surface spaced radially inwardly of the tube wall, the tube wall including the outer surface which in use is exposed to the concentrated radiant energy. The helically extending barrier means suitably extends from the inner wall to the tube wall.

In one form, the helically extending barrier means is defined by a separate helical separator member or members which may comprise a helically formed wire having a diameter substantially the same as the distance between the inner wall and tube wall.

In an alternative form, the helically extending barrier means may comprise a fin, rib or other member projecting inwardly from the tube wall towards the inner wall. In yet an alternative form, the helical barrier means may comprise a fin, rib or other member on the inner wall which project outwardly towards the tube wall.

The inner wall may comprise the wall of an inner hollow tubular member arranged coaxially within the absorber tube. In this configuration, the inner tubular member may define internally a flow passage for supply of fluid to or for conveying fluid from the helical flow passage. Alternatively, the inner wall may comprise the wall of a solid tubular member In yet a further arrangement where an inner tubular member is provided, a feed tube may be located coaxially within the inner tubular member, the feed tube being spaced from the inner tubular member to define an air space insulating inward flow from outward flow. Preferably, corresponding inner ends of the inner tubular member and feed tube are interconnected. Preferably also the corresponding outer ends of absorber tube and inner tubular member are interconnected.

Typically, the pitch of the helical barrier means is approximately ½ of the diameter of the absorber tube however the pitch may be varied to increase or decrease the cross section of the helical flow passage and therefore decrease or increase the speed of flow of water/steam along the passage. The pitch may also vary along the length of the absorber tube to suit the degree of conversion of water into steam and suit continuous expansion of the steam whilst maintaining optimum Reynolds numbers.

Suitably the grooves in the outer surface of the absorber tube are arranged in a juxtaposed attitude relative to each other and provided substantially over the whole of the exposed surface of the absorber tube.

The grooves suitably comprise grooves which extend circumferentially around the absorber tube transversely relative to the longitudinal axis of the tube. Most suitably, the grooves are defined by a screw thread formed in the exposed surface of the tube. Alternatively, the grooves in the surface exposed to the concentrated solar energy may extend longitudinally and parallel to the longitudinal axis of the absorber tube.

Typically, the included angle of the V-shaped grooves is in the range of 30° to 70° where the operating temperature is 300° C. to 600° C. and the absorptivity of the absorber tube is in the range of 70% to 95% and the emissivity of the absorber tube at the operating temperatures referred to above is in the range of 5% to 30%.

The grooves in the outer surface of the absorber tube may be formed by any known process such as by machining or casting.

The present invention also provides solar energy concentrating apparatus including a radiant solar energy absorber tube assembly of the above-described type.

The present invention in yet a further aspect provides a solar energy absorber tube assembly for receiving concentrated solar energy comprising an outer tubular member, said tubular member having an outer surface arranged to be exposed in use to concentrated radiant solar energy, said outer surface being provided with a plurality of grooves, said grooves being of substantially V-shaped configuration in cross section, a first inner tubular member arranged coaxially within said outer tubular member and defining therewith an annular space, a helically extending separator within said annular space and defining a helical flow passage extending along said absorber tube assembly for the passage of water and/or steam, an outlet at one end of said absorber tube assembly communicating with said annular space for outlet flow of water and/or steam from said helical flow passage, and a second inner tubular member arranged coaxially within and spaced from said first inner tubular member, said second inner tubular member communicating with said annular space at the other end of said absorber tube assembly, said second inner tubular member defining an inlet for the flow of water and/or steam to said helical flow passage for flow therethrough to said outlet.

Suitably, the second inner tubular member is fixed at its inner end to the corresponding inner end of the first inner tubular member Preferably, the second inner, tubular member is free at its outer end so as to be capable of movement upon heat expansion relative to the first inner tubular member.

In yet a further aspect, the present invention provides radiant solar energy concentrating apparatus including a plurality of solar energy absorbers of the above type wherein the outlets of respective solar energy absorbers are connected to the inlet of adjacent solar energy absorbers whereby the solar energy absorbers are arranged in series.

In yet a further aspect, the present invention provides solar energy concentrating apparatus including at least one solar concentrator and an absorber tube assembly for receiving radiant solar energy concentrated by said solar concentrator, said absorber tube assembly comprising a fluid flow absorber tube having an outer surface, said surface being provided with a plurality of grooves, said grooves being of substantially V-shaped configuration in cross section, and a helically extending flow passage within said fluid flow tube and adjacent said outer surface for the passage of water and/or steam through said absorber tube assembly.

Preferably, the absorber tube assembly includes a first inner tubular member arranged coaxially within said absorber tube and defining therewith an annular space, a helical separator in said annular space defining said helically extending flow passage, and a second tubular member arranged coaxially within said first tubular member and spaced therefrom, said second tubular member defining a feed tube for supplying water and/or steam to said helical flow passage.

The present invention in yet a further aspect provides a method of generating superheated steam, said method including the steps of:

providing radiant solar energy concentrating apparatus comprising a plurality of solar energy concentrators, absorber tube assemblies associated with each concentrator to receive concentrated solar energy therefrom, each said absorber tube assembly comprising fluid flow absorber tube having an outer surface, said surface being provided with a plurality of grooves, said grooves being of substantially V-shaped configuration in cross section, and a helically extending flow passage within said fluid flow tube and adjacent said outer surface for the passage of water and/or steam through said absorber tube assembly, said absorber tube assemblies of respective solar energy concentrators being connected in series, and supplying water to said series of absorber tube assemblies, said water being heated and converted into steam and said steam being heated into superheated steam in passage through respective absorber tube assemblies.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE PREFERRED EMBODIMENTS

Figure 1:
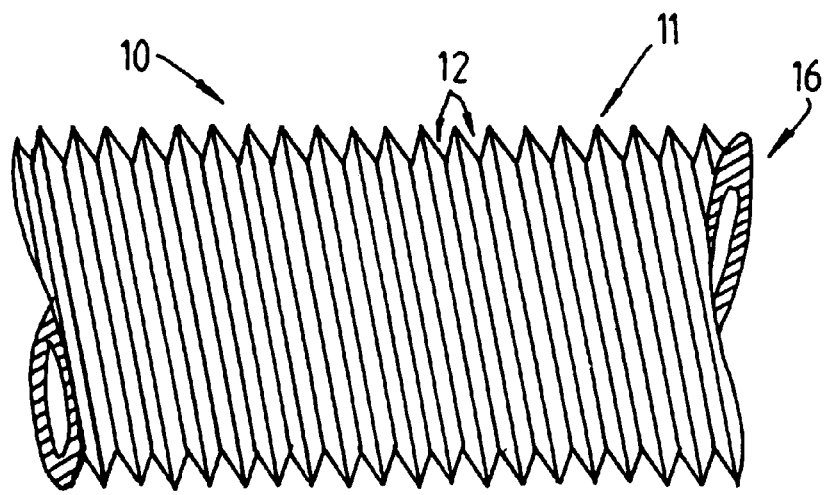
FIG. 1 illustrates a portion of a tubular solar energy absorber provided with a threaded outer surface in accordance with a first aspect of the present invention.
Figure 2:
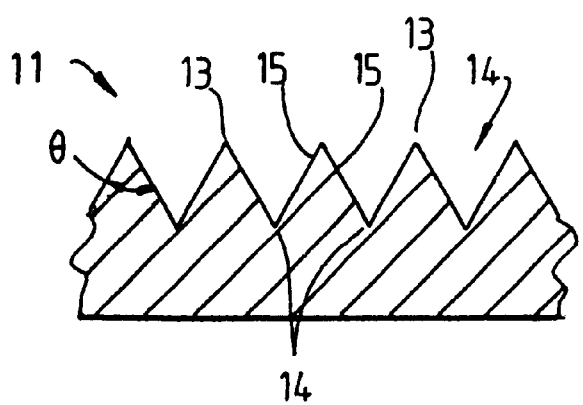
FIG. 2 is an enlarged sectional view of the wall of the absorber of FIG. 1.

Referring to the drawings and firstly to FIG. 1 there is illustrated a tubular solar energy absorber 10 provided with an enhanced energy collection outer surface 11 in accordance with one aspect of the present invention. The surface 11 includes a plurality of juxtaposed grooves 12 which extend circumferentially of the absorber 10 and which are of a substantially V-shaped configuration in cross section as shown in FIG. 2 defined by a plurality of peaks 13 and troughs 14 and having opposite inclined side walls 15. The included angle $\theta$ between the walls 15 is varied in accordance with the emissivity and absorptivity of the surface 11 of the absorber 10 and the operating temperature of the absorber 10.

In the above embodiment, the grooves 12 are formed as a screw thread cut or otherwise formed in the exposed surface 11 of the absorber 10. Typically, the thread angle $\theta$ is in the range of 50° to 70° and most preferably 60° where the absorptivity of the absorber 10 is 85% to 95% and the emissivity of the absorber 10 at the temperature involved is 5% to 15%

Where the absorptivity of the absorber is 70% to 90% and the emissivity of the absorber at the temperatures involved is 10% to 30%, the thread angle $\theta$ is preferably in the range of 30° to 50° and most preferably 40°

The solar energy absorbers 10 of the invention are primarily designed for use in solar energy concentrating apparatus having concentrators which focus and concentrate radiant solar energy on focus lines at which the absorbers are located. It has been found that use of the groove configuration described above enhances energy collection and thus efficiency of operation. Light rays from the sun concentrated by the apparatus impinging on the surfaces 15 of the grooves 12 are either absorbed or reflected depending upon the absorptivity of the absorber 10. Rays reflected from one surface 15 are directed towards the opposite surface 15 where they are either absorbed or again reflected. A substantial proportion of the energy emitted from the surfaces 15 however is also trapped within the grooves 12 and re-absorbed. Thus enhanced absorption of solar energy from the sun is achieved.

Typically, the tubular absorbers 10 are constructed from stainless steel tube 25.4 mm in diameter and have an active length of 200 mm however the dimensions are dictated by solar concentrator design. The V-sectioned thread typically has a 1 mm pitch and 60 degrees included angle. The surface 11 may also be suitably treated with a low cost conversion coating to produce a selective surface. The absorber 10 may be constructed of any suitable materials to achieve; the required absorptivity and emissivity as described above.

A low cost conversion coating used for treating stainless steel tube is capable of withstanding high temperatures in air and can achieve solar absorptances of $\alpha \approx 0.9$ whilst maintaining low thermal emittances. While an absorptance of 0.9 is high, it still represents an unacceptable loss of energy in a large concentrator system where capital costs increase directly with primary mirror area. The effective absorptance can be increased by texturing the surface with grooves as described above and trapping multiple incidences of incoming light. A simple screw thread with 60 degrees included angle will result in an average of 2.3 reflections (worst case at 90 degrees sun elevation) before incident light escapes the surface. Tile effective absorptance is therefore raised from 0.9 for a simple cylindrical surface to $1-0.1^{23}=0.995$ for the grooved surface. A disadvantage of the grooved configuration is (hat the amount of thermal radiation emitted from the absorber also rises as the absorber has a larger emitting surface area and only a small fraction of the radiation emitted by one side of the groove is re-absorbed by the opposite side. However since so me of the emitted radiation is reabsorbed (through self incidence within the groove) the effective emittance does not rise in direct proportion to the increase in the surface area of the grooved tubular absorber 10. Using ray-tracing techniques, it has been shown that the effective emittance rises from 0.2 to 0.35 instead of 0.4 which would be expected for the factor of 2 increase in the surface area. An included groove or thread angle of 60 degrees gives an acceptable balance between increased absorptance and increased losses through thermal emittance in the system however the thread angle may be varied as stated above.

Figure 3:
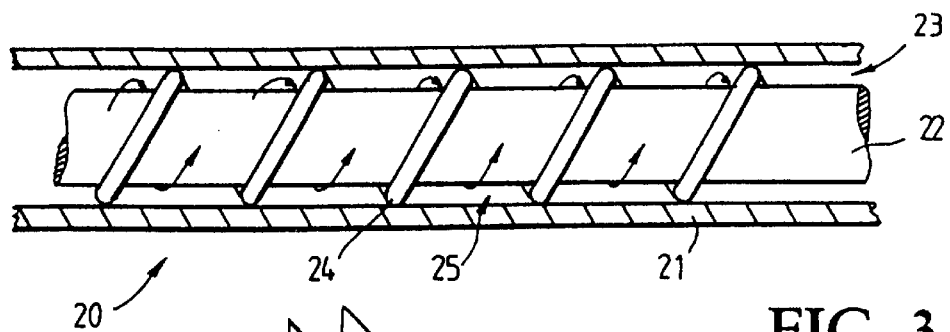
FIG. 3 illustrates in part sectional view one form of solar energy absorber tube assembly according to the present invention for use in solar energy concentrating apparatus.

Referring now to FIG. 3 there is illustrated a solar energy absorber tube assembly according to a further embodiment of the invention including an outer hollow cylindrical tubular member 21 and an inner member 22 located coaxially within the outer tubular member 21 and defining an annular space 23 therebetween. The inner member 22 has a cylindrical outer wall or surface and may be solid or hollow. A single start helical barrier 24 is located within the annular space 23 and extends along the tube assembly 20 to define with the inner and outer members 22 and 21 and between the flights or turns of the barrier 24, a helical flow passage 25. In this embodiment, the barrier 24 is defined by a wire which is of a diameter substantially the same or slightly less than the radial distance between the inner and outer tubular members 22 and 21 so as to be in relatively firm contact with the walls of the inner and outer tubular members 21 and 22 but not necessarily in sealing contact.

Water or other fluid introduced into the annular space 23 is constrained to travel helically along the tube assembly 20. As the water is flowing in a generally circumferential direction around the tube 22, at constant pressure, the velocity of the water is substantially increased resulting in a turbulent flow. As the flow is turbulent, the Reynolds number is increased providing for increased thermodynamic efficiency. When the lube assembly 20 is subject to sufficient heat, water flowing in the passage 25 will be converted into steam and heavier water droplets, because of the centrifugal force generated as the water and steam flow along the passage 25, will be flung outwardly against the inner surface of the outer tube 21 so as to be subject to the heat applied to the tube 21 to be more readily converted into steam. Water is thus progressively boiled as it passes along the tube assembly 20 and the steam produced is heated by the heat energy applied to the tube assembly 20.

Figure 4:
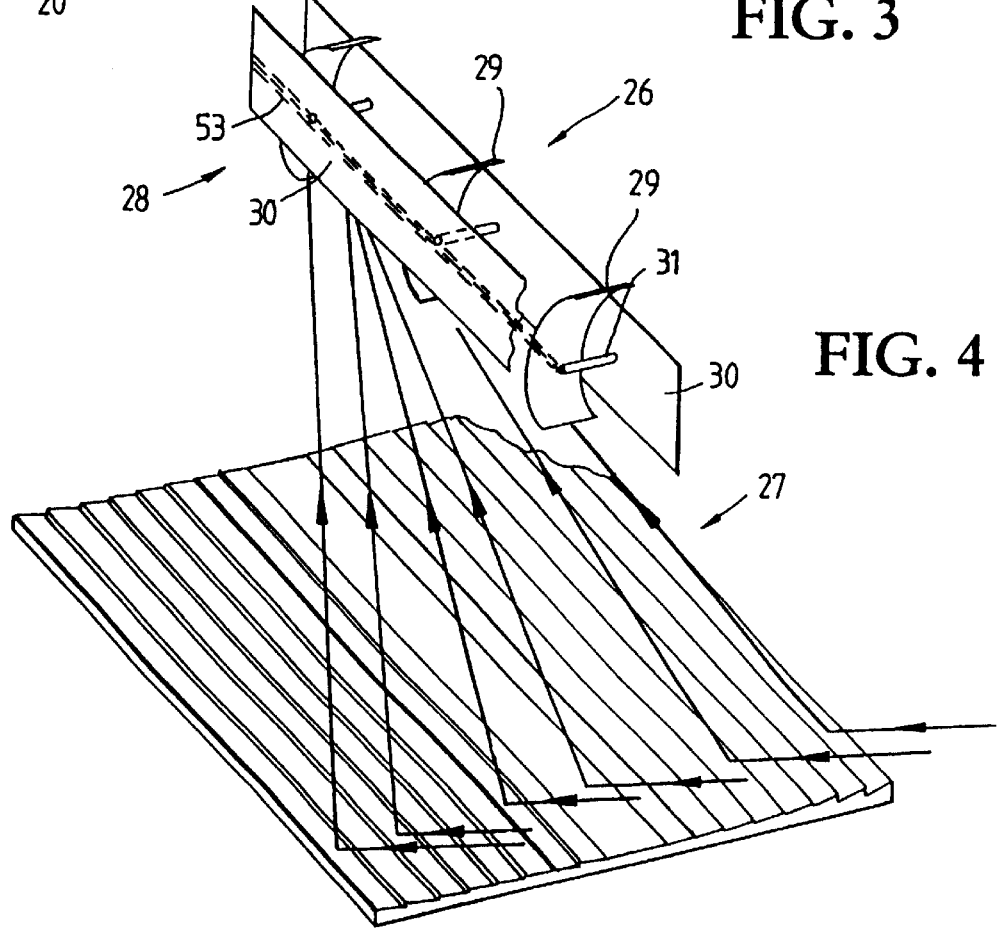
FIG. 4 illustrates in sectional view one form of solar energy concentrating apparatus using the solar energy absorber tube assemblies of the invention.

The tubular absorber 10 of FIG. 1 or the absorber assembly 20 of FIG. 3 typically may be placed at the focus line of a parabolic reflecting trough which concentrates radiant solar energy on the absorber. The parabolic reflecting trough may be a primary reflecting trough or secondary reflector which receives energy concentrated by the primary concentrator and concentrates it on the absorber. Solar energy concentrating apparatus of this type is illustrated in FIG. 4. In this apparatus, a primary parabolic Fresnel trough concentrator 27 concentrates solar energy on a secondary concentrator assembly 28 which includes a series of parabolic reflectors 29 located between opposite planar reflectors 30. Energy is concentrated by the reflectors 29 on solar energy absorbers 31 which lie along the focus lines of the parabolic reflectors 29. The apparatus of FIG. 4 is of the type disclosed in my U.S. Pat. No. 5,592,932, the contents of which are incorporated herein by reference. The absorbers 31 may comprise tubular absorber assemblies 20 of the type illustrated in FIG. 3.

Figure 5:
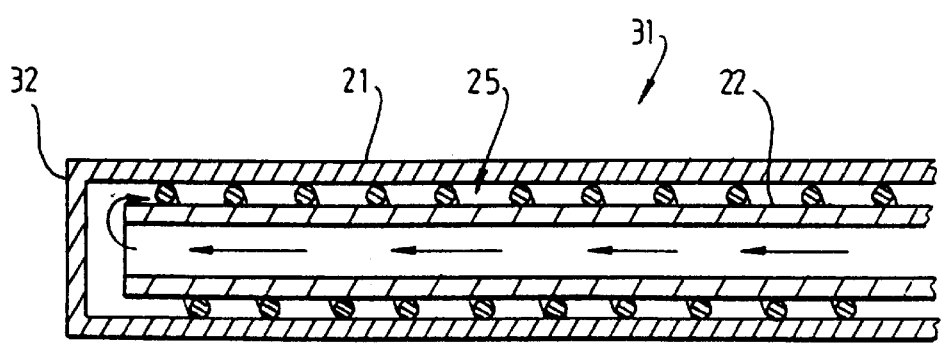
FIG. 5 illustrates a further embodiment of absorber tube assembly for use in the apparatus of FIG. 4.

The absorbers 31 however may also be of the configuration of FIG. 5, in which like components to the components of FIGS. 3 have been give like numerals. In this embodiment, the inner member 22 is formed as a hollow open-ended tube and the outer tubular member 21 closed at one end as at 32. The inner member 22 serves as a supply tube supplying water and/or steam as indicated by the arrows in FIG. 5 to the inner end of the absorber 31 adjacent the closed end 32 for flow back along the helical passage 25 around the inner tubular member 22.

A series of absorbers 31 associated with respective parabolic concentrators 29 may be arranged in series to ensure efficient conversion of water into steam and preferably superheated steam. Thus water may be successively converted into a water/steam mixture, the water/steam mixture into saturated steam, saturated steam into dry steam and dry steam into superheated steam in passage through the respective absorbers 31. The resultant steam produced may then be used for driving steam turbines for power generation or for any other applications. It will be apparent that in this process, the conversion of water into steam is effectively a one-pass operation.

Figure 6:
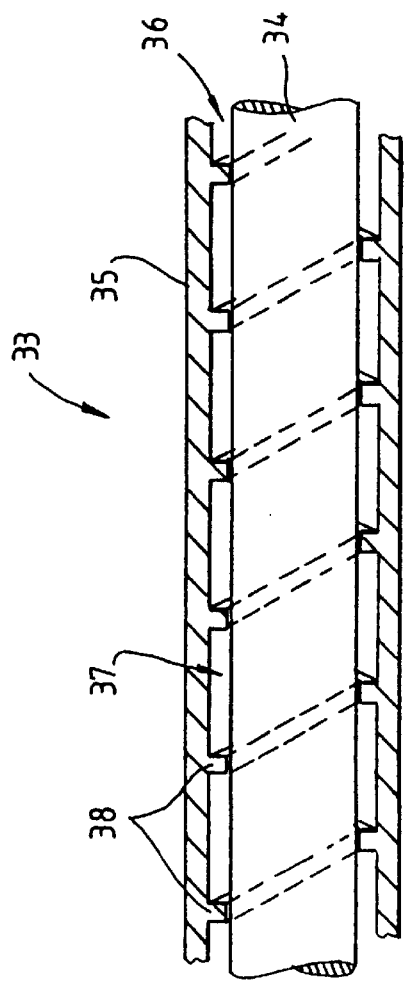
FIG. 6 illustrates in part sectional view a further form of solar energy absorber tube assembly according to the invention.

Referring now to FIG. 6, there is illustrated an alternative absorber tube assembly 33 comprising in this instance inner and outer coaxial tubes 34 and 35 defining an annular space 36 therebetween. In this instance however, the helical flow passage 37 extending along the tube assembly 33 is defined by a helical rib or fin 38 which is formed integrally with the outer tube 35 and which extends radially inwardly towards, to terminate adjacent, the inner tube 34. As the rib or fin 38 is formed integrally with the outer tube 35, it will conduct heat energy and enhance the conversion of water into steam and heating of the formed steam. The inner tubular member 34 may be hollow to conduct water and/or steam to the helical passage 37 in the manner described with reference to FIG. 5 or alternatively, the inner member 34 may be solid.

In this embodiment, the helical barrier or fin 38 is shown as extending from the outer wall however it may also be provided on the inner member 34, being integrally formed therewith, to extend outwardly towards the outer tube 35. It is not necessary in either case that the rib of fin 38 be in sealing contact with the inner member 34 or outer tube 35 provided that it is sufficiently closely located to direct the water and/or steam helically along the tube assembly 33.

Whilst not shown in FIGS. 5 and 6, the outer tubes 21 or 35 of the absorber tube assemblies 20 and 33 which are subject to heat energy are provided with projections or other formations on their outer surface to enhance heat collection and absorption which comprise a thread or groove-like configuration of the type disclosed with reference to FIGS. 1 and 2. Additionally, the outer surface may be black or a dark colour for more efficient absorption of radiant energy.

The inner and outer tubes or equivalent members may be formed of any suitable material such as stainless steel. Further insulating means may be provided within the inner tubular members 22 (or 34) to prevent or minimise heat conduction between the fluids flowing within the tubular member 22 (or 34) and outside the tubular member 22 (or 34). Such means may be a further tubular member formed of an insulating material such as glass or alternatively, the internal surface of the tubular member 22 (or 34) may be provided with a heat insulating material or surface. Further the tube assembly 20 (or 31 or 33) may be surrounded by glazing or other transparent material to prevent heat loss from the tube assembly. The glazing may comprise a coaxial outer tubular member formed of glass or other transparent material.

Figure 7:
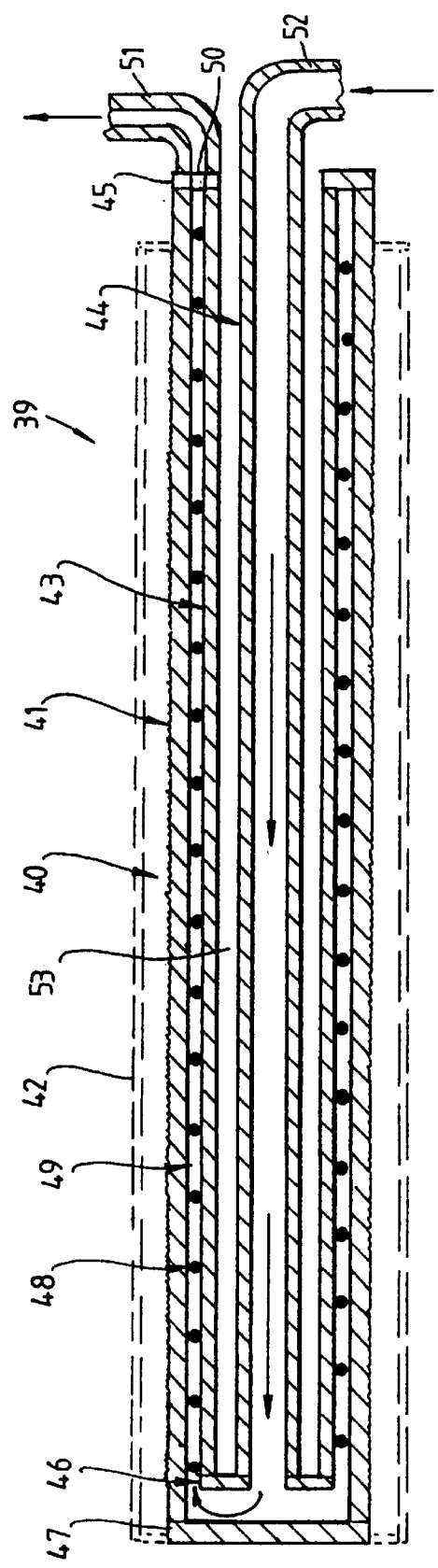
FIG. 7 illustrates in sectional view a further embodiment of solar energy absorber tube assembly for use in solar energy concentrating apparatus.

A typically practical embodiment of absorber or collector tube assembly 39 for use in the solar energy collecting apparatus 26 of FIG. 4 in place of the absorber 31, or in other solar energy collecting apparatus which concentrates solar energy on an absorber tube assembly, is shown in FIG. 7. The tube assembly 39 includes an outer metal tube 40 suitably of stainless steel having an external surface which is thread cut with a "V" thread 41 of the form described above with reference to FIGS. 1 and 2. In this embodiment, the tube 40 has an active length of 200 mm and a diameter of 25.4 mm however these dimensions are varied with concentrator design. To reduce convection losses, the tube 40 may be enclosed in coaxial transparent tube 42 (shown in dotted outline) formed of a glass such as Pyrex. The tube 42 suitably has an anti-reflection coating to provide a nominal 2% reflectance in the visible band for, both the inner and outer surface of the tube 42.

An inner metal tube 43 for example formed of stainless steel is located coaxially within the outer tube 40. A further metal supply or feed tube 44 is located coaxially within the tube 43. The outer ends of the tubes 40 and 43 are joined to each other by an annular member 45 similar to a washer preferably by welding to seal the outer ends of tubes 40 and 43 to each other. The inner ends of the tubes 43 and 44 are similarly joined to each other by an annular member, 46 again preferably by welding to seal the tubes 43 and 44 and rigidly connect them to each other. The end of the tube 40 is closed by a circular end plate 47 spaced from the member 46 so that liquid flowing into the tube 44 can pass around the corresponding inner ends of the tubes 44 and 43 into the space between the inner and outer tubes 43 and 40. A wire 48 is wrapped helically around the inner tube 43, the wire 48 being of a diameter which is substantially the same as the radial distance between the inner and outer tubes 40 and 43 so as to define therebetween a helical fluid flow path 49 extending along the tube assembly 39.

An opening 50 is formed in the end annular member 45 for exit of liquid via a suitable duct 51 whilst the outer end of the tube 44 defines an inlet for liquid and may terminate in an inlet duct or elbow 52. As is apparent, the tube 44 is spaced inwardly from the tube 43 so as to define an insulating air space 53 therebetween which is exposed to the atmosphere. Further the tube 44 is only supported at its inner end by the member 46 to the tube 43 and is free at its opposite outer end so as to be free for movement upon for example heat expansion of the tube assembly 39 or associated components.

Feed water enters the absorber tube assembly 39 via the inlet elbow 52 to flow along the central feed tube 44 and back through the annulus between the inner and outer tubes 43 and 40 along the helical passage 49 defined by the helical wire 48 to be heated by the solar energy concentrated on the tube assembly 39. The air space 53 functions to insulate the cooler feed water from the heated water or steam flowing back between the inner and outer tubes 43 and 40. For flow rates used in this system, in the absence of the helical wire 48, flow through the annulus between the inner and outer tubes 43 and 40 would be laminar with consequently low heat transfer coefficients. To increase heat transfer, the fluid is forced by the wire 48 to take a helical path through the annular space between inner and outer tubes 43 and 40. Heated water and/or steam exits through the outlet 50 and outlet duct 51. Thus feed and exit pipes are connected at the same side of the absorber tube assembly 39 simplifying assembly.

The absorber tube assemblies 39 may typically be used in solar energy concentrating apparatus 26 of the type illustrated in FIG. 4 in place of the absorbers 31. In order to convert the feed water into superheated steam, four absorber tube assemblies 39 are connected in series so that each will provide one-quarter of the overall enthalpy change. The absorber assemblies 39 are connected in series by suitable connecting ducting 53 shown in dotted outline in FIG. 4 to connect the outlet duct 51 of one absorber tube assembly 39 to the inlet duct 52 of the next absorber tube assembly 39 and so on. The first absorber tube assembly 39 will heat the water to boiling point, the next two absorber tube assemblies 39 will boil the water to saturated steam and the fourth absorber tube assembly 39 will provide the final super heating. As the connecting ducting 53 is all on the one side, assembly and disassembly of the apparatus is facilitated.

The helical fluid flow through the tube assembly 39 produces high centrifugal forces which "spin dry" the steam during the boiling transition and enhance heat transfer during the super-heating phase. Using four tube assemblies 39 in series provides an advantage that mass flow is quadrupled leading to higher fluid velocities and better heat transfer between the wall of the tube 40 and water. Further as three of the tube assemblies 39 are operating at much lower temperatures, the radiative and convective losses from these tube assemblies are greatly reduced.

Whilst the above described arrangement of absorber tube assemblies 39 is preferred, it will be appreciated that the tube assemblies 39 may be connected in a different configuration. Further the absorber tube assemblies 39 may be used in other solar energy concentrating apparatus. The medium for flow through the absorber tube assemblies described above is usually water but it may comprise any other liquid or fluid.

Whilst the above has been, given by way of illustrative embodiment of the invention, all such variations and modifications thereto as would be apparent to persons skilled in the art are deemed to fall within the broad scope and ambit of the invention as defined in the appended claims.

What is claimed is:

1. A solar energy absorber tube assembly for receiving concentrated solar energy comprising an outer tubular member, said tubular member having an outer surface arranged to be exposed in use to concentrated radiant solar energy, said outer surface being provided with a plurality of grooves, said grooves being of substantially V-shaped configuration in cross section, a first inner tubular member arranged coaxially within said outer tubular member and defining therewith an annular space, a helically extending separator within said annular space and defining a helical flow passage extending along said absorber tube assembly for the passage of water and/or stream, an outlet at one end of said absorber tube assembly communicating with said annular space for outlet flow of water and/or stream from aid helical flow passage, and a second inner tubular member arranged coaxially within and spaced from said first inner tubular member, said second inner tubular member communicating with said annular space at the other end of said absorber tube assembly, said second inner tubular member defining an inlet for the flow of water and/or steam to said helical flow passage for flow therethrough to said outlet.

2. A solar energy absorber tube assembly according to claim 1 wherein said second inner tubular member is fixed at its inner end to the corresponding end of said first inner tubular member.

3. A solar energy absorber tube assembly according to claim 2 wherein said second inner tubular member is free at its outer end so as to be capable of movement upon heat expansion relative to said first inner tubular member.

4. Solar energy concentrating apparatus including at least one solar energy absorber tube assembly of the type defined in claim 1.

5. Solar energy concentrating apparatus including a plurality of solar energy absorber tube assemblies of the type defined in claim 2 wherein the outlets of respective absorber tube assemblies are connected to the inlets of adjacent absorber tube assemblies whereby said absorber tube assemblies are arranged in series.

6. A solar energy absorber tube assembly for receiving and collecting radiant solar energy concentrated by a solar concentrator, said absorber tube assembly comprising a fluid flow absorber tube, said absorber tube having a tubular wall, said wall having an outer surface arranged to be exposed in use to said concentrated solar energy, an inner hollow tubular member arranged coaxially within said absorber tube and defining with said absorber tube, a longitudinally extending annular space, helically extending barrier means provided within said annular space and defining a helically extending flow passage within said space for the passage of a fluid through said absorber tube assembly, and a feed tube for supply of fluid to said helically extending flow passage, said feed tube being located coaxially within said inner tubular member and spaced therefrom to define an insulating space to insulate inward flow through said feed tube from outward flow through said helically extending flow passage.

7. An absorber tube assembly according to claim 6 wherein said helically extending barrier means is defined by a separate helical separator member.

8. An absorber tube assembly according to claim 7 wherein said separator member comprises a helically formed wire.

9. An absorber tube assembly according to claim 6 wherein said helically extending barrier means comprise fins or ribs projecting inwardly from said tubular wall towards said inner tubular member.

10. An absorber tube assembly according to claim 6 wherein said helically extending barrier means comprise fins or ribs on said inner tubular member which project outwardly towards said tubular wall.

11. An absorber tube assembly according to claim 6 wherein corresponding inner ends of said inner tubular member and feed tube are connected and wherein corresponding outer ends of said absorber tube and inner tubular member are interconnected.

12. An absorber tube assembly according to claim 6 wherein said outer surface is provided with a plurality of grooves, said grooves being of substantially V-shaped configuration in cross section.

13. An absorber tube assembly according to claim 12 wherein said grooves extend around said absorber tube transversely relative to the longitudinal axis of said absorber tube.

14. An absorber tube assembly according to claim 13 wherein said grooves are defined by a screw thread formed in said outer surface.

15. An absorber tube assembly according to claim 12 wherein the included angle of said grooves is in the range of 30° to 70°.

16. Radiant solar energy concentrating apparatus including at least one solar energy absorber tube assembly of the type defined in claim 6.

17. Solar energy concentrating apparatus including at least one solar concentrator and an absorber tube assembly for receiving radiant solar energy concentrated by said solar concentrator, said absorber tube assembly comprising a fluid flow absorber tube having an outer surface adapted to be exposed to said concentrated solar energy, a first inner tubular member arranged coaxially within said absorber tube and defining therewith an annular space, a helical separator in said annular space defining a helical flow passage extending along said absorber tube assembly, and a second tubular member arranged within said first tubular member and spaced therefrom, said second tubular member defining a feed tube for supplying fluid to said helical flow passage, and wherein the space between said feed tube and second tubular member defines an insulating space insulating flow through said feed tube from flow through said helical flow passage.

18. A method of generating superheated steam, said method including the steps of:

providing radiant solar energy concentrating apparatus comprising a plurality of solar energy concentrators, absorber tube assemblies associated with each concentrator to receive concentrated solar energy therefrom, each said absorber tube assembly comprising a fluid flow absorber tube, a first inner tubular member arranged coaxially within said absorber tube and defining therewith an annular space, a helical separator in said annular space defining a helical flow passage extending along said absorber tube assembly, and a second tubular member arranged coaxially within said first tubular member and spaced therefrom, said second tubular member defining a feed tube for supplying water and/or steam to said helical flow passage, said absorber tube assemblies of respective solar energy concentrators being connected in series, and supplying water to said series of absorber tube assemblies, said water being heated and converted into steam and said steam being heated into super-heated steam in passage through respective absorber tube assemblies.

* * * * *